United States Patent [19]
Woo et al.

[11] Patent Number: 6,046,140
[45] Date of Patent: Apr. 4, 2000

[54] ACID GELS FOR FRACTURING SUBTERRANEAN FORMATIONS

[75] Inventors: George Tso-chih Woo, Houston; Joel Lynn Boles, Spring; Enrique Lopez, Midland; Arthur Steven Metcalf, Tomball; Jeffrey Carl Dawson, Spring, all of Tex.

[73] Assignee: BJ Services Company, Houston, Tex.

[21] Appl. No.: 09/408,291

[22] Filed: Sep. 29, 1999

Related U.S. Application Data

[62] Division of application No. 09/052,324, Mar. 31, 1998, Pat. No. 5,975,206.

[51] Int. Cl.$^7$ .................................................. E21B 31/00
[52] U.S. Cl. ........................ 507/204; 166/307; 166/308; 166/300; 507/923
[58] Field of Search .................... 166/300, 307, 166/308; 507/204, 921, 923

[56] References Cited

U.S. PATENT DOCUMENTS

| | | | |
|---|---|---|---|
| 3,974,077 | 8/1976 | Free | 252/8.55 R |
| 4,100,079 | 7/1978 | Sinkovitz et al. | 252/8.55 C |
| 4,604,218 | 8/1986 | Dawson | 252/8.553 |
| 4,749,041 | 6/1988 | Hodge | 166/308 |
| 4,997,582 | 3/1991 | Clark et al. | 252/8.553 |
| 5,310,003 | 5/1994 | Jennings | 166/307 |
| 5,392,855 | 2/1995 | Bernardi et al. | 166/278 |
| 5,465,792 | 11/1995 | Dawson et al. | 166/295 |
| 5,497,830 | 3/1996 | Boles et al. | 166/300 |

FOREIGN PATENT DOCUMENTS 2158487  11/1985  United Kingdom.

OTHER PUBLICATIONS

SPE 35228 *Acid Manufacturing in the Warren Unit of Southeastern New Mexico*; Steven Metcalf, SPE, Brian Ward, SPE, Wayne Davis, SPE, Daniel H. Gray, Jr., SPE, BJ Services Company, and Jeff Brienen, SPE, and Joe Miller, SPE, Conoco, Inc. (1996).

*Developed Comprehensive Models for Acid Fracturing Treatments*; J. Jianxun, R. Shuquan, G. Fagang (1998).

*Optimization of Acid Fracturing Design of Horizontal Wells in Naturally Fractured Reservoirs*; Jian chun Guo, Jin zhou Zhao, Shu quan Ren, Guang Wu. (1998).

SPE 36615 *Improving Hydrocarbon/Water Ratios in Producing Wells—An Indonesian Case History Study*; Frederick O. Stanley, SPE, BJ Services, Hardianto, BJServices, Ewen Mamoch, SPE, BJ Services, and Patemus Syukur Tanggu, PT Caltex Pacific Indonesia (1996).

*Primary Examiner*—Roger Schoeppel
*Attorney, Agent, or Firm*—Arnold, White & Durkee

[57] ABSTRACT

A crosslinked acid gel comprising an emulsion polymer and an external activator is provided. Methods for acid fracturing subterranean formations using the crosslinked acid gel are also provided.

6 Claims, No Drawings

ACID GELS FOR FRACTURING SUBTERRANEAN FORMATIONS

This is a divisional of application Ser. No. 09/052,324, filed Mar. 31, 1998 now U.S. Pat. No. 5,975,206.

FIELD OF THE INVENTION

The present invention relates generally to fracture acidizing subterranean formations to stimulate oil and gas wells using a crosslinked acid gel as a fracturing fluid.

BACKGROUND OF THE INVENTION

Subterranean formations of oil and gas wells are often treated by hydraulically fracturing the formations to increase the production of oil or gas. Fracturing of the formations is accomplished by pumping fluids into the bore holes of the oil or gas wells under high pressure so that cracks or fissures are opened into the surrounding formation. Typically, the fracturing fluid is a polymer which has been gelled to increase its viscosity. The fluid's viscosity is proportionally related to the created fracture geometry and fracture width so that the more viscous fluids will produce longer and wider fractures. After the fracturing fluid is injected into the formation to produce the fracture, the viscosity of the fluid is reduced by means of "gel breakers" which break down the gelled fluid so that it can be easily pumped and removed from the well.

In certain formations, aqueous acid solutions can be used to improve the permeability of the formation, thereby increasing production. These acids are often combined with the polymer gels used in fracturing to provide an acid fracturing fluid. One of the benefits of combining the aqueous acid solutions with gelled fracturing fluids is that the gelled fluid inhibits or retards the reaction of the acid with the formation. This is beneficial in that the acid would otherwise react too quickly, depleting the acid with very little penetration of the formation. Once in place, the viscosity of the fluid is reduced so that the acid is released to react with formation damage or other skin present at the face of the newly formed fractures and improving the permeability of the producing strata.

Crosslinked polymer gels have been particularly useful with these aqueous acid solutions. Crosslinked gels are able to withstand the high temperature conditions commonly found in deeper oil and gas wells with little reduction in viscosity, and they exhibit an improved ability in reducing the reaction rate of the acid solution. Organometallic compounds are often used as a crosslinking agent in these polymer gels. It has been found that gels crosslinked with zirconium and titanium compounds can be treated with certain gel breaking substances, such as fluoride, phosphate or sulfate anions, to break the linkages of the crosslinked polymer fluid, thus reducing the viscosity of the gel.

Typically, crosslinked polymer gels are prepared by batch mixing. In the batch mix process, acid is contained in a storage tank which connects to a blender via a suction pump. The suction pump draws the acid into the blender and through the blender tub, where a polymer (with an inverting agent or internal activator blended in) is added via a chemical additive unit attached to the blender tub. Agitation and shear are applied, and the acid/polymer mixture is circulated back through the storage tank containing the acid. The process is repeated over and over again until an acid gel having the desired viscosity is attained. The acid gel must be stored in the tank to allow the polymer to hydrate before the crosslinker is added. If the crosslinking agent is added too early, it will prevent the hydration of the polymer. Once the polymer is properly hydrated, the crosslinking agent is blended into the acid gel, and the crosslinked polymer gel is injected into the wellbore.

The batch mixing process has several disadvantages, including the delay associated with waiting for the acid gel to re-circulate and waiting for the polymer to hydrate. Typical hydration times with polymers known in the art are 30 minutes to several hours. It is not uncommon for the final polymer gel composition to be of less than desirable consistency, and if polymer concentrates are not hydrated fully, "fish eyes" of unhydrated polymers form. These fish eyes can significantly impair permeability into the wellbore. Batch mixing is also inefficient and costly because if any mechanical problems force the job to shut-down early, the components of the unused batch-mixed gel product must be discarded.

There are also disadvantages associated with polymers known in the art, which are typically available as polymer dispersions with a preblended inverting agent (i.e., an internal activator). Because an inverting agent increases a polymer dispersion's viscosity, a polymer dispersion that has the inverting agent blended in will become more and more viscous over time. As a result, the polymer dispersion's pourability and stability are affected, reducing the polymer dispersion's shelf-life and eventually making the polymer dispersion useless. Further, the end-user cannot control the polymer dispersion's viscosity profile by choosing how much inverting agent to use for a particular application. Finally, the use of nonylphenolethoxylate, an inverting agent commonly preblended in polymer dispersions known in the art, has been banned in the North Sea due to environmental concerns.

SUMMARY OF THE INVENTION

The present invention relates generally to a process for acid fracturing a subterranean formation using a crosslinked acid gel that comprises an emulsion polymer and an external activator. The emulsion polymer serves as a gelling agent and the external activator serves as a surfactant or inverting agent. The use of an external activator facilitates the preparation of the acid gel by continuous mixing.

DETAILED DESCRIPTION OF THE INVENTION

A novel system for acid fracturing subterranean formations with crosslinked acid gels is provided. The acid gel, i.e., the fracturing fluid, utilizes an emulsion polymer as a gelling agent and an external activator as an inverting agent or surfactant. The emulsion polymer is a copolymer of acrylamidomethylpropane sulfonic acid (AMPS) and acrylamide and has the general structure:

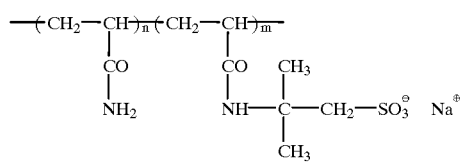

where m=2–5 and n=4–8. In one embodiment, the emulsion polymer comprises a polymer dispersion in a hydrocarbon phase. In another embodiment, the emulsion polymer comprises microemulsion particles. In still another embodiment, the emulsion polymer comprises a liquid polymer dispersion. In a preferred embodiment, the emulsion polymer comprises "BXX-AGA-818" available from BJ Services Co. The external activator has the general structure:

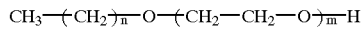

where m=3–12 and n=8–15, and more preferably m=6 and n=12. In a preferred embodiment, the external activator comprises "PSA2L" available from BJ Services Co.

To prepare the crosslinked acid gel, the emulsion polymer and external activator are mixed with an aqueous acid solution. The polymer takes in the water, hydrating rapidly and forming a gelled acid. Unlike with prior art acid gels, an 85–95% polymer hydration rate can be achieved within 3–5 minutes or less (as shown in Example 4 below), thus facilitating continuous mix applications. As the gelled acid proceeds towards the well bore, a crosslinking agent and other additives are added. The crosslinked acid gel is injected into the wellbore or at least a portion of a subterranean formation at high enough pressures to form fractures within the formation. The gel may be prepared by batch mixing, continuous mixing, or other suitable methods known to those of skill in the art.

In the continuous mix process, all the additives are added to the acid gel during injection of the fracturing fluid into the wellbore. This process negates the need for a storage vessel to hydrate the polymer such as is used in the batch mix process. Problems associated with batch mixing, such as the delay in re-circulating the acid/polymer mixture and the loss of unused product due to an early shut-down, are eliminated, making the continuous mix process more efficient and cost-effective.

The emulsion polymer has a general composition of about 20 to 50% acrylamidomethylpropane sulfonic acid (AMPS), about 2 to 5% acrylic acid, and about 45 to 78% acrylamide. More preferably, the polymer comprises about 35 to 50% AMPS. Because the polymer is not preblended with an inverting agent (i.e. an external activator is used), the emulsion polymer has a lower pour point and viscosity profile, excellent dispersibility in fresh water, brine and aqueous acids, and a good shelf life. The polymer's lower pour point and viscosity profile make it very easy to pump out of a drum, especially in cold weather, and its greater dispersibility makes the polymer readily dispersible in the acid, without the problems of lumping or "fish eyes." The finer emulsion particle size provides a prolonged shelf life, with no settling effect. Moreover, the user can control the viscosity of the polymer by choosing how much activator to add, and the external activator is environmentally friendly.

Typically, about 5 to 50 gallons of emulsion polymer are added per one thousand gallons of acid (gpt). Preferably, 10 to 30 gpt of emulsion polymer are used, and more preferably, 15 to 20 gallons of emulsion polymer are used. The external activator comprises about 0.1 to 5 gpt and preferably comprises about 1 to 2 gpt. The crosslinker comprises about 4 to 20 gpt and more preferably about 8 to 15 gpt. The fracturing acid utilized may be any of the aqueous solutions of acid commonly employed for acidizing formations, such as hydrochloric acid, formic acid, acetic acid, or mixtures thereof. Preferably, the acid comprises hydrochloric acid. The aqueous acid solution should preferably have a concentration of about 3 to 28%, and more preferable about 15 to 20%.

The crosslinking agent may comprise any suitable crosslinker known in the art. In a preferred embodiment, the crosslinking agent comprises a zirconium based crosslinker, including but not limited to zirconium lactate, zirconium acetate and zirconium lactate with alkanolamine. Additives used in the oil and gas industry and known in the art, including but not limited to, corrosion inhibitors, non-emulsifiers, iron control agents, delay additives, silt suspenders, flowback additives, and gel breakers, may be used. Proppants including, but not limited to, 100 mesh sand, 20/40 mesh frac sand, and resin coated sand, may also be used.

The following examples are intended to illustrate the present invention and in no way limit or restrict its scope.

EXAMPLE 1

Viscosity (cPs) of Polymers A–D was measured at increments of 10° F. using the Fann 35 viscometer at 511 sec$^{-1}$. Polymer A was a composite of 12 drums, where samples were taken from the top 12 to 18 inches of each drum. The individual drum samples were collected in glass bottles and allowed to stand for four days without agitation. A slight turbidity was noted in the bottom 25% to 33% of the bottle in each of the 12 samples. The results are shown in Table 1 below:

Polymer A: "BXX-AGA-818" polymer (available from BJ Services Co.)

Polymer B: "AG56L" polymer with internal activator (available from BJ Services Co.)

Polymer C: Polymer A diluted with 10% diesel

Polymer D: Polymer B diluted with 10% diesel

TABLE 1

| | Viscosity (cPs) of Polymers A–D vs. Temperature (° F.) | | | | | | | |
|---|---|---|---|---|---|---|---|---|
| | 40° F. | 50° F. | 60° F. | 70° F. | 80° F. | 90° F. | 100° F. | 110° F. |
| A | 39 | 33 | 30 | 26 | 23 | 21 | 19 | 16 |
| B | 300+ | 300+ | 300+ | 300+ | 300+ | 300+ | 266 | 234 |
| C | 27 | 24 | 22 | 20 | 18 | 16 | 14 | 12 |
| D | 300+ | 300+ | 300+ | 300+ | 140 | 117 | 96 | 82 |

EXAMPLE 2

Viscosity (cPs) of Polymers A and C was measured, as in Example 1. Test samples were prepared in the lab. The results are shown in Table 2 below:

TABLE 2

| | Viscosity (cPs) of Polymers A and C vs. Temperature (° F.) | | | | | | | |
|---|---|---|---|---|---|---|---|---|
| | 40° F. | 50° F. | 60° F. | 70° F. | 80° F. | 90° F. | 100° F. | 110° F. |
| A | 69 | 60 | 53 | 46 | 40 | 36 | 32 | 29 |
| C | 43 | 37 | 32 | 28 | 24 | 21 | 19 | 17 |

EXAMPLE 3

Eight solutions (E–L) were prepared with the following components, using Polymer A from Example 1 (12 drum composite):

E 20% HCl, 2 gpt "CI-25" corrosion inhibitor, 2 gpt "PSA2L" external activator, 15 gpt Polymer A F 20% HCl, 2 gpt "CI-25" corrosion inhibitor, 2 gpt "PSA2L" external activator, 20 gpt Polymer A G 20% HCl, 2 gpt "CI-25" corrosion inhibitor, 2 gpt "PSA2L" external activator, 3 gpt "FE-270" iron control agent, 2 gpt "FE-271" iron control agent, 3 gpt "FE-300L" iron control/delay additive, 2 gpt "FE-800L" iron control/delay additive, 20 gpt Polymer A H 20% HCl, 0.5 gpt "CI-25" corrosion inhibitor, 20 gpt Polymer A I 20% HCl, 1.0 gpt "CI-25" corrosion inhibitor, 20 gpt Polymer A J 20% HCl, 1.0 gpt "CI-25" corrosion inhibitor, 1 gpt "PSA2L" external activator, 20 gpt Polymer A K 20% HCl, 2.0 gpt "CI-25" corrosion inhibitor, 15 opt Polymer B L 20% HCl, 2.0 gpt "CI-25" corrosion inhibitor, 20 gpt Polymer B Corrosion inhibitor "CI-25" and iron control agents "FE-270", "FE-271", "FE-300L" and "FE-800L" are available from BJ Services Co. The viscosity (cPs) of solutions E–L was measured at 72° F. at intervals of 1, 3, 5, 10, 20, 30, 60 and 120 minutes using the Fann 35 viscometer at 511 sec$^{-1}$. Fish eyes were visible for solutions K and L. The results are shown in Table 3 below:

TABLE 3

| Viscosity (cPs) of Solutions E–L over Time (min) | | | | | | | |
|---|---|---|---|---|---|---|---|
| 1 min | 3 min | 5 min | 10 min | 20 min | 30 min | 60 min | 120 min |

| | 1 min | 3 min | 5 min | 10 min | 20 min | 30 min | 60 min | 120 min |
|---|---|---|---|---|---|---|---|---|
| E | 12 | 13 | 14 | 14 | 15 | 15 | 15 | 15 |
| F | 15 | 17 | 17 | 18 | 20 | 20 | 20 | 20 |
| G | 14 | 16 | 18 | 19 | 19 | 20 | 21 | 21 |
| H | 4 | 6 | 7 | 10 | 12 | 14 | 15 | 15.5 |
| I | 6 | 8 | 10 | 12 | 15 | 15 | 16 | 16 |
| J | 17 | 18 | 19 | 19 | 20 | 20 | 20 | 21 |
| K* | 11 | 13 | 14 | 14 | 14 | 14 | 14 | 14 |
| L* | 15 | 18 | 19 | 20 | 21 | 22 | 22 | 23 |

*Fish eyes visible.

EXAMPLE 4

Examples E–J were prepared and tested as in Example 3, using Polymer A from Example 2 (lab prep sample). The results are shown in Table 4 below:

TABLE 4

| Viscosity (cPs) of Solutions E–J over Time (min) | | | | | | | |
|---|---|---|---|---|---|---|---|

| | 1 min | 3 min | 5 min | 10 min | 20 min | 30 min | 60 min | 120 min |
|---|---|---|---|---|---|---|---|---|
| E | 14 | 14 | 14 | 14 | 14 | 14 | 14 | 14 |
| F | 19.5 | 20.5 | 20 | 19.5 | 20 | 20 | 20 | 20 |
| G | 18 | 19 | 19.5 | 20 | 20 | 20 | 20 | 20 |
| H | 5 | 6 | 11 | 13 | 15 | 17 | 20 | 20 |
| I | 5 | 9 | 11 | 14 | 17 | 18 | 20 | 20 |
| J | 18 | 19 | 19.5 | 20 | 20 | 20 | 20 | 20 |

EXAMPLE 5

Solutions M–O were prepared by mixing the following components. Polymer A from Example 1 (12 drum composite) was used:

M 20% HCl, 1.0 gpt "CI-25" corrosion inhibitor, 2 gpt "PSA2L" external activator, 2 gpt "FE-270" iron control agent, 2 gpt "FE-271" iron control agent, 3 gpt "NE-13" nonemulsifier, 3 gpt "FAW18W" surfactant, 20 gpt Polymer A, 8 gpt "XLA2" crosslinking agent N 20% HCl, 1.0 gpt "CI-25" corrosion inhibitor, 2 gpt "PSA2L" external activator, 2 gpt "FE-270" iron control agent, 2 gpt "FE-271" iron control agent, 3 gpt "NE-13" nonemulsifier, 3 gpt "FAW 18W" surfactant, 20 gpt Polymer A, 8 gpt crosslinking agent, 1 gpt "FE-300L" iron control/delay additive (in base gel)

O 20% HCl, 1.0 gpt "CI-25" corrosion inhibitor, 2 gpt "PSA2L" external activator, 2 gpt "FE-270" iron control agent, 2 gpt "FE-271" iron control agent, 3 gpt "NE-13" nonemulsifier, 3 gpt "FAW18W" surfactant, 20 gpt Polymer A, 8 gpt crosslinking agent, 3 gpt "FE-300L" iron control/delay additive (in base gel)

The crosslink times for solutions M–O were measured at 90° F. Nonemulsifier "NE-13", crosslinker "XLA2", and surfactant "FAW18W" are available from BJ Services Co. The results are shown in Table 5 below.

TABLE 5

| Crosslinking of Solutions M–O | | | | |
|---|---|---|---|---|
| | Closure | Crown | Full Crosslink | Remarks |
| M | 2 sec. | 12 sec. | 22 sec. | weak |
| N | 3 sec. | 11 sec. | 26 sec. | excellent |
| O | 4 sec. | 10 sec. | 23 sec. | excellent |

Those skilled in the art will recognize that, while specific embodiments have been illustrated and described, various modifications and changes may be made without departing from the spirit and scope of the invention.

What is claimed is:

1. A crosslinked acid gel for fracturing subterranean formations, comprising:

an emulsion polymer of the formula

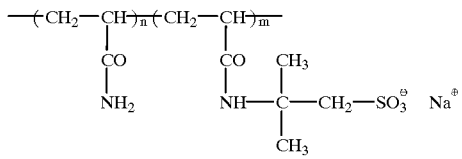

where m=2–5 and n=4–8;

an external activator of the formula

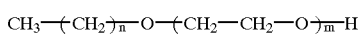

where m=3 to 12 and n=8–15;

an aqueous acid, and a zirconium based crosslinking agent.

2. The crosslinked acid gel of claim 1, wherein said emulsion polymer comprises about 5 to 50 gallons per 1000 gallons of said aqueous acid.

3. The crosslinked acid gel of claim 1, wherein said external activator comprises about 0.1 to 5 gallons per 1000 gallons of said aqueous acid.

4. The crosslinked acid gel of claim 1, wherein said crosslinking agent comprises about 4 to 20 gallons per 1000 gallons of said aqueous acid.

5. The crosslinked acid gel of claim 1, wherein said aqueous acid has a concentration of about 3 to 28%.

6. The crosslinked acid gel of claim 1, wherein said aqueous acid comprises hydrochloric acid, formic acid, acetic acid, or mixtures thereof.

* * * * *